US011588408B2

(12) United States Patent
Bianco et al.

(10) Patent No.: US 11,588,408 B2
(45) Date of Patent: Feb. 21, 2023

(54) POWER SUPPLY CIRCUIT, CORRESPONDING DEVICE AND METHOD

(71) Applicant: STMicroelectronics S.r.l., Agrate Brianza (IT)

(72) Inventors: Alberto Bianco, Gressan (IT); Francesco Ciappa, Borgofranco d'Ivrea (IT); Giuseppe Scappatura, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 39 days.

(21) Appl. No.: 17/240,037

(22) Filed: Apr. 26, 2021

(65) Prior Publication Data

US 2021/0351707 A1 Nov. 11, 2021

(30) Foreign Application Priority Data

May 6, 2020 (IT) .......................... 102020000010141

(51) Int. Cl.
*H02M 3/335* (2006.01)
*H02M 1/00* (2006.01)

(52) U.S. Cl.
CPC ..... *H02M 3/33569* (2013.01); *H02M 1/0035* (2021.05); *H02M 1/0054* (2021.05);
(Continued)

(58) Field of Classification Search
CPC ........... H02M 3/33569; H02M 1/0054; H02M 3/335; H02M 1/0006; H02M 1/0025; Y02B 70/10
See application file for complete search history.

(56) References Cited

U.S. PATENT DOCUMENTS 5,751,139 A * 5/1998 Jordan .............. H02M 3/33561
323/222
7,529,105 B1 * 5/2009 Choi ................. H02M 3/33523
363/21.18
(Continued)

*Primary Examiner* — Yusef A Ahmed
(74) *Attorney, Agent, or Firm* — Slater Matsil, LLP (57) ABSTRACT

An embodiment provides a circuit including a transformer having a primary winding coupled to an input port configured to receive an input voltage and a secondary winding configured to provide an output voltage at an output port, controller circuitry configured to switch on and off a current through the primary winding so that energy is transferred to the secondary winding while switching and supply circuitry connected to the controller circuitry, wherein the supply circuitry is coupled to an auxiliary winding of the transformer and configured to provide a supply voltage for the controller circuitry. The controller circuitry is further configured to: transition to a burst mode to switch on and off the current through the primary winding in first bursts, wherein the first bursts are separated by intervals during which switching on and off the current through the primary winding of the transformer by the first bursts is discontinued and provide second bursts during the intervals in order to keep the supply voltage of the controller circuitry between a lower bound value and an upper bound value while the output voltage ramps down to a requested valley value or provide second bursts during the intervals after reaching a timeout limit in order to provide the supply voltage to the controller circuitry while the output voltage ramps down to a requested valley value.

20 Claims, 6 Drawing Sheets

(52) U.S. Cl.
CPC ...... *H02M 3/33523* (2013.01); *H02M 1/0006* (2021.05); *H02M 1/0025* (2021.05)

(56) References Cited

U.S. PATENT DOCUMENTS

| | | | | |
|---|---|---|---|---|
| 8,031,493 | B2* | 10/2011 | Huang | H02M 3/33507 363/21.18 |
| 9,766,584 | B1* | 9/2017 | Ogishima | G03G 15/80 |
| 10,505,461 | B2* | 12/2019 | Chang | H02M 1/36 |
| 10,784,789 | B1* | 9/2020 | Nasir | H02M 1/08 |
| 2006/0044845 | A1* | 3/2006 | Fahlenkamp | H02M 3/33523 363/21.15 |
| 2006/0250823 | A1* | 11/2006 | Murata | H02M 3/33523 363/18 |
| 2008/0043504 | A1* | 2/2008 | Ye | H02M 3/33507 363/97 |
| 2008/0192515 | A1* | 8/2008 | Huynh | H02M 3/33507 363/21.01 |
| 2009/0134859 | A1* | 5/2009 | Shiroyama | H02M 3/33507 323/282 |
| 2010/0195355 | A1* | 8/2010 | Zheng | H02M 3/33507 363/21.12 |
| 2011/0019446 | A1* | 1/2011 | Wu | H02M 3/33523 363/79 |
| 2011/0022867 | A1* | 1/2011 | Chang | G09G 5/00 713/340 |
| 2012/0176819 | A1* | 7/2012 | Gao | H02M 1/36 363/21.12 |
| 2013/0003421 | A1* | 1/2013 | Fang | H02M 3/33523 363/21.01 |
| 2013/0027988 | A1* | 1/2013 | Yang | H02M 3/33507 363/21.15 |
| 2013/0148387 | A1* | 6/2013 | Ren | H02M 1/36 363/21.16 |
| 2013/0229829 | A1* | 9/2013 | Zhang | H02M 3/33571 363/16 |
| 2013/0241509 | A1* | 9/2013 | Chung | H02M 3/33523 323/282 |
| 2013/0250627 | A1* | 9/2013 | Herfurth | H02M 3/3376 363/21.15 |
| 2014/0160808 | A1* | 6/2014 | Sato | H02M 3/33507 363/21.02 |
| 2015/0280573 | A1* | 10/2015 | Gong | H02M 3/33592 363/21.14 |
| 2015/0280576 | A1* | 10/2015 | Hinz | H02M 3/33507 363/21.15 |
| 2015/0288288 | A1* | 10/2015 | Chang | H02M 3/33523 363/21.16 |
| 2015/0318777 | A1* | 11/2015 | Pasqua | H02M 1/08 363/21.13 |
| 2015/0357927 | A1* | 12/2015 | Zhang | H02M 3/3376 363/21.02 |
| 2015/0372603 | A1* | 12/2015 | Tang | H02M 3/33523 363/21.15 |
| 2016/0294273 | A1* | 10/2016 | Kawamura | H02M 3/33507 |
| 2016/0352237 | A1* | 12/2016 | Quigley | H02M 1/08 |
| 2017/0201181 | A1* | 7/2017 | Yabuzaki | H02M 1/12 |
| 2017/0338746 | A1* | 11/2017 | Chen | H02M 3/33523 |
| 2017/0346405 | A1* | 11/2017 | Lin | H05B 45/382 |
| 2017/0366089 | A1* | 12/2017 | Matsuda | H02M 3/33507 |
| 2018/0323717 | A1* | 11/2018 | Chang | H02M 1/36 |
| 2019/0089257 | A1* | 3/2019 | Chung | H02M 1/08 |
| 2019/0245448 | A1* | 8/2019 | Chung | H02M 1/08 |
| 2019/0245449 | A1* | 8/2019 | Chung | H02M 1/08 |
| 2019/0252985 | A1* | 8/2019 | Radic | H03K 7/08 |
| 2019/0341852 | A1* | 11/2019 | Fahlenkamp | H02M 3/33515 |
| 2019/0386559 | A1* | 12/2019 | Tsou | H02M 1/32 |
| 2020/0287454 | A1* | 9/2020 | Lee | G06F 13/4282 |
| 2021/0111631 | A1* | 4/2021 | Kobayashi | H02M 1/0035 |
| 2021/0242789 | A1* | 8/2021 | Su | H02M 3/33523 |
| 2022/0216797 | A1* | 7/2022 | Endo | H02M 7/12 |

* cited by examiner

POWER SUPPLY CIRCUIT, CORRESPONDING DEVICE AND METHOD

CROSS-REFERENCE TO RELATED APPLICATIONS

This application claims priority to Italian Patent Application No. 102020000010141, filed on May 6, 2020, which application is hereby incorporated herein by reference.

TECHNICAL FIELD

The description relates to power supply circuits.

One or more embodiments can be applied to various types of devices, such as, by way of example, sensors (MEMS-based sensors, for instance), regulators and reference generators.

One or more embodiments can be applied, again by way of example, in various industrial sectors such as power conversion (in power converter regulators, for instance).

BACKGROUND

Modern AC/DC power supplies, such as those following the USB-PD (USB Power Delivery) specifications, can change an output voltage regulation according to requests coming from a load.

Power can be supplied to a primary side controller (an integrated circuit or IC, for instance) by an auxiliary winding on the primary side of a transformer in the controller. When the system is switching, a small part of the converter power flows through the auxiliary winding and provides a supply for the IC.

In the presence of a low load (or if no load is present) such a controller may operate in a burst mode, switching for a short time and then stopping for a relatively long time. The controller in this phase starts the active phase when the output voltage drops below a given threshold.

SUMMARY

Embodiments provide improved power supply circuits and methods to operate these power supply circuits.

For instance, controlled burst during transitions is a desirable feature in many applications of these supply circuits.

One or more embodiments may facilitate obtaining an adequate primary side supply via an auxiliary winding during negative voltage transitions, for instance.

BRIEF DESCRIPTION OF THE DRAWINGS

One or more embodiments will now be described, by way of example only, with reference to the figures.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Various acronyms will be repeatedly used in the following.

The meaning of these, otherwise conventional, acronyms is explained by way of introduction to the present description of exemplary embodiments.

UVLO=Under Voltage Lock Out. This refers to an under-voltage lockout function. During operation, if a power supply voltage drops and becomes lower than a UVLO detection voltage, the system is restarted.

LDO=Low Drop Out (regulator). The designation low-dropout or LDO regulator applies to DC regulators capable of maintaining regulation with small differences between the input (supply) voltage and the output (load) voltage that is able to regulate the output voltage even when the input voltage is very close to the output voltage.

FSM=Finite State Machine

µC=Microcontroller

ADC=Analog to Digital Converter

Modern AC/DC power supplies, such as those following the USB-PD (USB Power Delivery) specifications, can change an output voltage regulation according to requests coming from a load.

Figure 1:
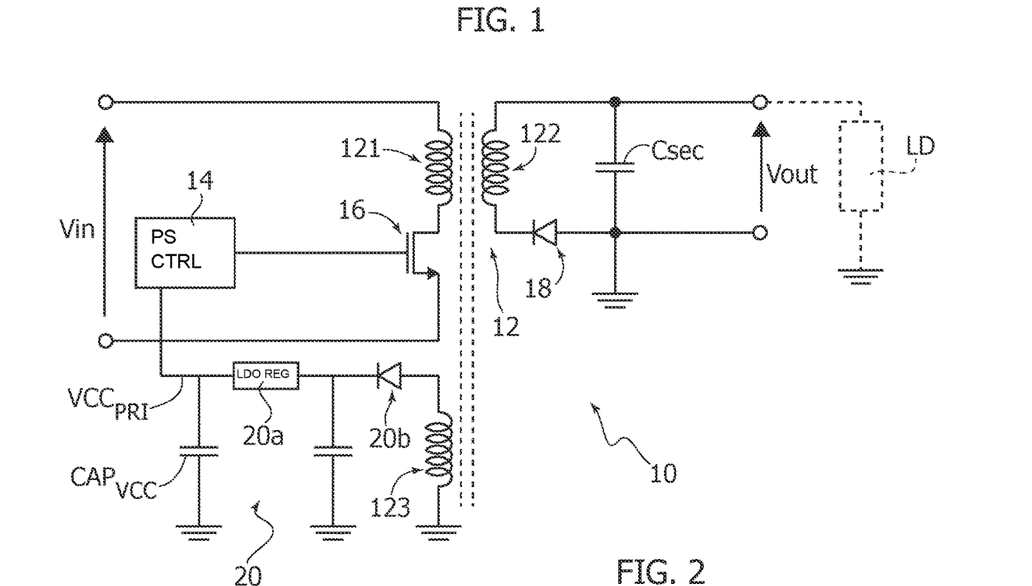
FIG. 1 is a circuit diagram exemplary of the provision of a power supply therein.

A conventional AC/DC converter topology currently resorted to (in USB-PD chargers, for instance) is a flyback topology as illustrated in FIG. 1.

Such a converter, designated 10 as a whole in FIG. 1, is intended to have an input voltage Vin and to produce an output voltage Vout to be applied to a load LD.

It is noted that the load LD (illustrated in dashed lines throughout the figures) may be a distinct element from the embodiments.

Also, the diagram of FIG. 1 can be held to be exemplary of similar topologies such as the topology currently referred to as active clamp flyback.

The converter 10 illustrated in FIG. 1 comprises a transformer having:

a primary winding 121 coupled to an input port including two input nodes which receive an input voltage Vin applied therebetween, a secondary winding 122 intended to be coupled to the load LD in order to apply thereto an output voltage Vout across a secondary side capacitor Csec.

The converter 10 illustrated in FIG. 1 comprises a primary side controller 14.

As illustrated in FIG. 1, the controller 14 (an integrated circuit such as a μC, for instance) is configured to drive a main switch 16 to control current flow through the primary winding 121 of the transformer 12. The switch 16 may be an electronic switch such as a field-effect transistor, a MOSFET for instance.

As illustrated in FIG. 1, the controller 14 may have associated therewith (or incorporate)—in a manner known to those of skill in the art—one or more ADC's (ADC=Analog to Digital Converter) configured to convert to digital the signals supplied to the controller 14. These ADC's are not visible in the figures for simplicity.

The converter 10 illustrated in FIG. 1 also comprises a rectifier on the secondary side. Sometimes this may be a simple diode 18 as illustrated. Frequently it may comprise a synchronous rectifier switch (an electronic switch such as a field-effect transistor, a MOSFET, for instance) driven by a synchronous rectifier controller. Moreover, a feedback path may be included to provide a regulation feedback to the controller to control Vout.

These features are otherwise conventional in the art and are not visible in the figure for simplicity.

As illustrated in FIG. 1, the converter 10 comprises an auxiliary winding 123 (here shown on the primary side) which is used to provide a supply voltage VCCpri across a capacitor $CAP_{VCC}$ for the primary side controller 14. This may occur, for instance, via an LDO supply chain (of a conventional type) designated 20 as a whole and including (i.e.) a LDO regulator 20a and a diode 20b between the auxiliary winding 123 and the LDO regulator 20a.

In some systems like USB-PD (USB Power Delivery) the regulated output voltage Vout may change according to requests coming from the load LD through a dedicated communication protocol (this occurs in manner known to those of skill in the art, which makes it unnecessary to provide a more detailed description herein).

Transitions are often managed by performing controlled ramps (ascending and descending), that make the transition smooth and "well behaved."

In normal conditions, voltage transitions can be managed by changing the reference voltage applied to the voltage feedback path in compliance with the request, ramping the reference voltage from an initial to a final voltage, for instance.

As a result of the output load LD being (very low) or zero (no load) conditions can set in where, even if the converter stops completely, the output voltage Vout may take long to adjust to the new target voltage.

As discussed previously, when the converter 10 is switching (that is, with the switch 16 turned alternately on and off by the controller 14), a part of the converter power flows to the auxiliary winding 123 providing a supply voltage VCCpri for the IC 14.

In the presence of a low load (or if no load is present) coupled to Vout, certain controllers operate in burst mode, switching for a short time then stopping for a relatively long time. The controller in this phase starts an active phase where Vout drops below a given threshold.

Figure 2:
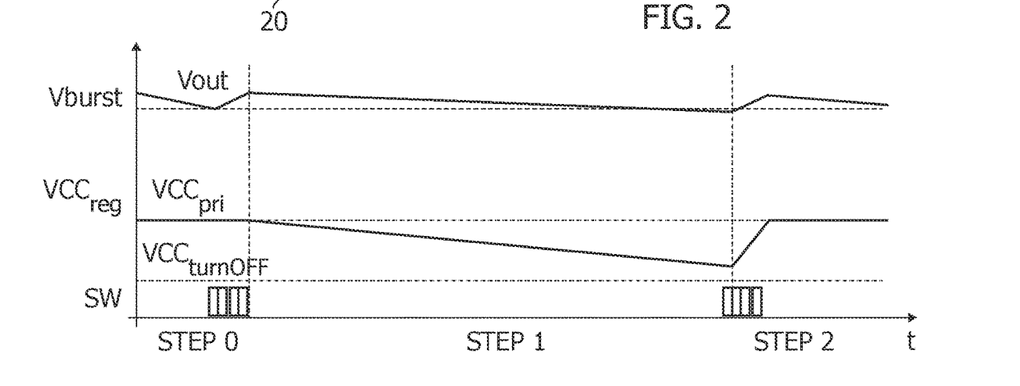
FIG. 2 is exemplary of possible burst mode operation of a circuit as illustrated in FIG. 1.

Such a behavior is exemplified in the curves of the diagram of FIG. 2, which (adopting a representation which will be adopted also for the diagrams of FIGS. 3, 5, 6, 10 and 14) represent against a common time scale (abscissa scale) possible behaviors (ordinate scale) of:

the output voltage Vout (upper curve), the supply voltage VCCpri provided to the controller 14 (lower curve).

In the case of FIG. 2, Vout is plotted against a reference Vburst and VCCpri is plotted against a regulation voltage VCCreg and a lower bound value VCCturnOFF.

The times where the converter 10 is switching are indicated at SW, distinguishing "active" phases or steps (STEP 0, STEP 2, for instance) and "inactive" phases or steps (STEP 1, for instance).

In conventional converters, the output capacitor Csec is (much) bigger than the capacitor $CAP_{VCC}$ at the output of the auxiliary winding 123. In normal operating conditions the current flowing towards the converter output (Vout) is orders of magnitude larger than the current absorbed by the primary side controller 14.

Conversely, in a burst mode, current consumption at the converter output (secondary side) and at the controller 14 (primary side) may become similar. As a result, between bursts the voltage on $CAP_{VCC}$ may drop more markedly than the output voltage. If the distance between bursts (STEP 1, for instance) becomes too long, the voltage on $CAP_{VCC}$ may drop below the lower bound value VCCturnOFF for primary side controller operation, thus causing the system to stop.

This event is likely to occur in systems with variable Vout as a result of a negative voltage transition requested while a low load or no load is applied.

Figure 3:
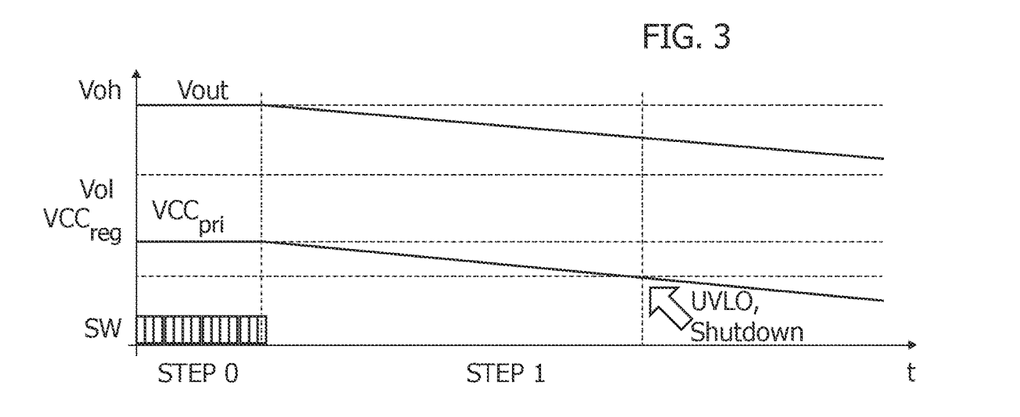
FIG. 3 is exemplary of a voltage transition resulting in a faulty condition.

This situation is exemplified in the diagram of FIG. 3.

In that respect it is noted that, in the diagrams of FIGS. 2, 3, 5, 6, 10 and 14 (and, more generally, throughout the figures annexed to this description) like entities, parts or elements are indicated with like reference symbols: a corresponding description will not be repeated for each and every figure for brevity.

As exemplified in FIG. 3, the converter performs a voltage transition (with Vout lying between an upper bound Voh and a lower bound Vol) in burst mode, and it waits a long time in off state (STEP 1). As a result, VCCpri may reach the lower VCCturnOFF threshold, triggering UVLO at the primary side, causing the converter 10 to stop (UVLO Shutdown in FIG. 3).

In order to manage negative transitions with low or no output load, some controllers may include a dissipative element (or "bleeder") on Vout to help output voltage drop. Such a bleeder element is exemplified as a current generator 22 in FIG. 4, which otherwise illustrates essentially the same circuit architecture illustrated in FIG. 1.

Figure 4:
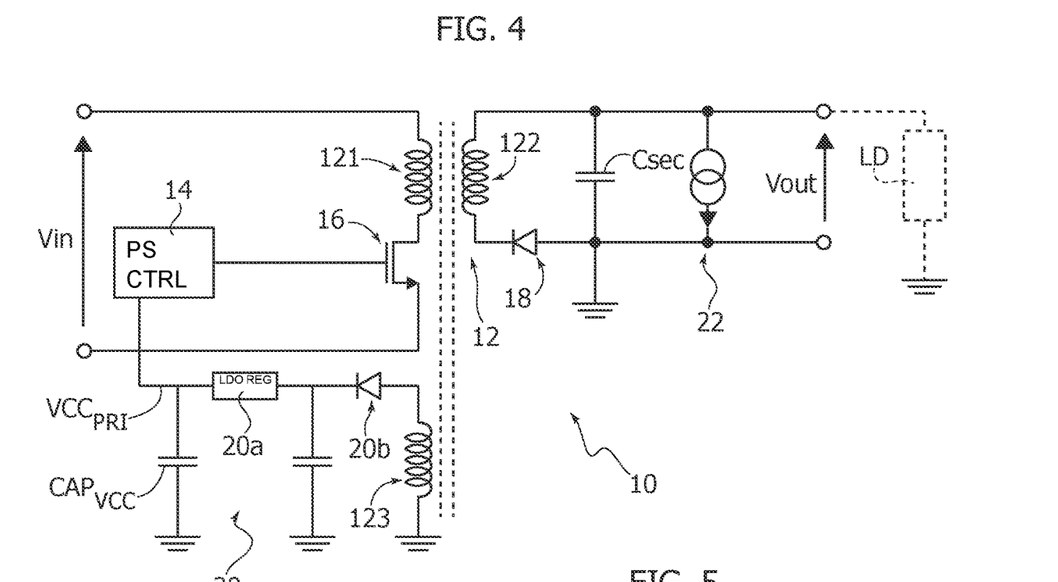
FIG. 4 is an exemplary circuit diagram of an arrangement including bleeders.

In a circuit architecture as illustrated in FIG. 4, the bleeder (or bleeders, more than one can be provided) 22 may be activated only during transitions.

Figure 5:
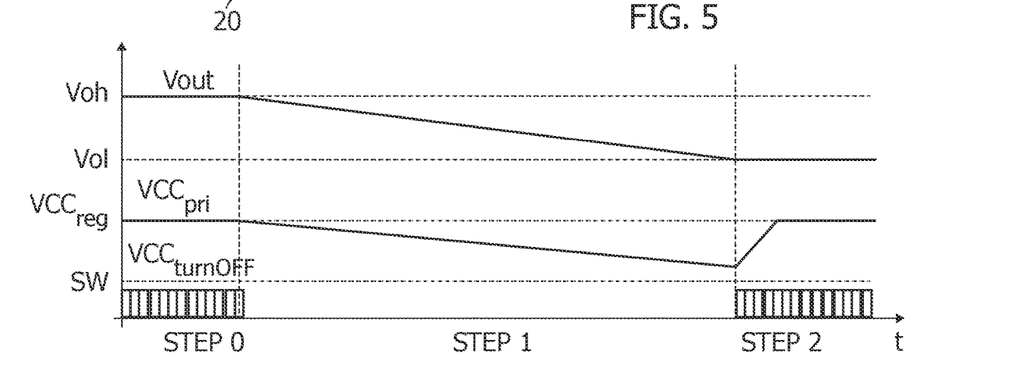
FIG. 5 is exemplary of a possible waveform therein.

The diagram of FIG. 5 (which adopts the same representation of FIG. 3) illustrates possible operation during a negative voltage transition in a converter 10 using a bleeder 22.

During STEP 1 bleeder(s) are turned on making the output voltage decrease with a derivative dv/dt which is (directly) proportional to the bleeding current and inversely proportional to the output capacitance.

If an insufficient current is drawn by the bleeder(s), the voltage VCCpri at the primary side can still reach the VCCturnOFF threshold where the system is stopped and restarted, failing to solve the related problem. This problem becomes more evident in the presence of a large capacity Csec involved in providing Vout.

It is noted that these issues (essentially avoiding undesired system shut-off) could be addressed increasing the capacity $CAP_{VCC}$ and/or increasing the bleeder drain capability. Both solutions are expensive in terms of space taken on the support board (a printed circuit board or PCB, for instance) and costs.

Indeed, integrating a high-current bleeder in an IC is hardly feasible, primarily in view of the heat generated by the bleeder: this is difficult to dissipate adequately through the package and would risk to damage the IC.

A solution to avoid hitting the primary side VCCturnOFF point may involve decreasing the regulation voltage (reference, VCCreg, on the primary side) slower than a minimum Vout slope.

Figure 6:
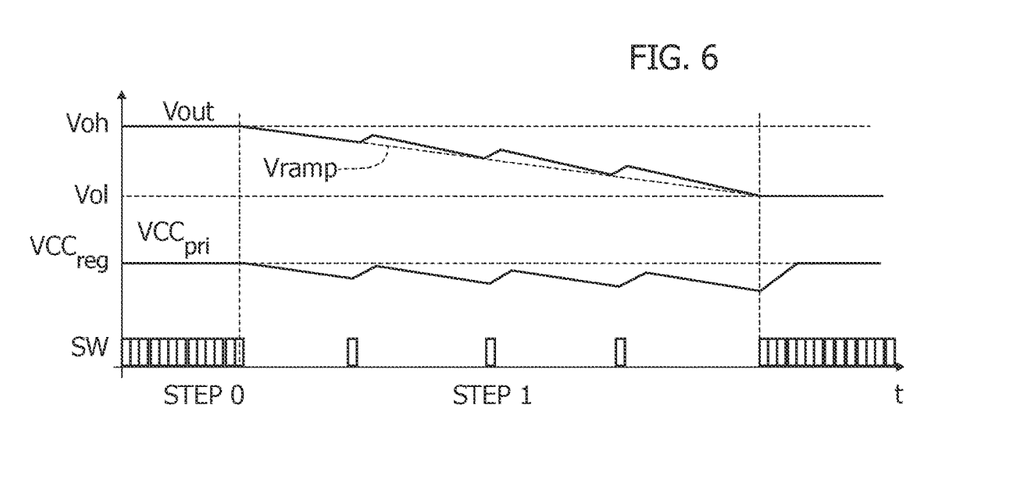
FIG. 6 is exemplary of a possible slow ramp behavior.

The diagram of FIG. 6 (which again adopts the same representation of FIGS. 3 and 5) is exemplary of such a slow ramp approach. In this case, switching bursts are activated with long time intervals therebetween, with these time intervals not long enough to cause system shut-down.

This results in (very) long transition times insofar as the energy provided by each burst further slows down the transition.

This kind of control makes transitions very slow but keeps the system alive. The impact on Vout is noticeable: Vout increases during bursts (see STEP 1 in FIG. 6) and the drop is non-monotone, which is undesirable in some protocols (USB-PD protocols, for instance).

One or more embodiments address these issues generating a controlled burst which is able to charge VCCpri while having a low impact on Vout, noting that a burst is a series of pulses giving rise to energy storage and energy transfer events.

One or more embodiments will now be discussed in connection with FIGS. 7 to 9. These figures refer to the same circuit architecture already discussed in connection with FIG. 4, assuming a turn ratio 1:1 of the auxiliary winding 123 to the secondary winding. This assumption is merely for simplicity of explanation (no voltage resealing considered) and not imperative for the embodiments.

One or more embodiments take advantage of the possibility of transferring power on the winding where the associated capacitor is less charged.

Figure 7:
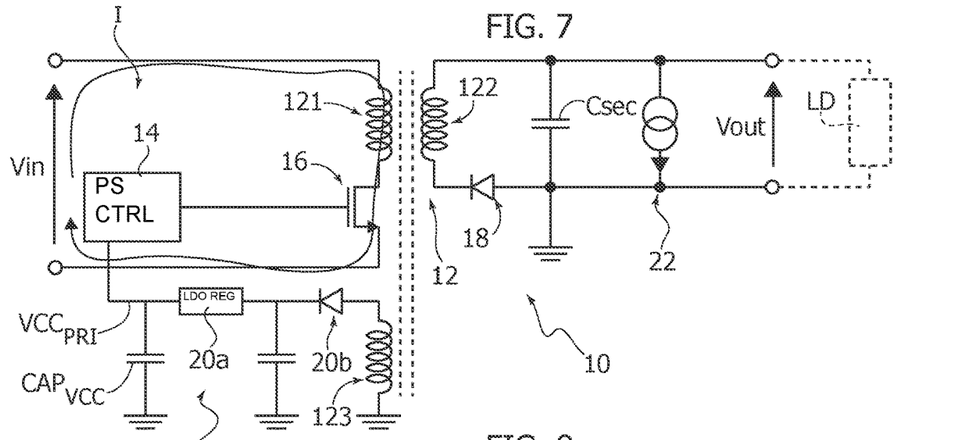
FIG. 7 is exemplary of an energy storage action in embodiments of the present description.
Figure 8:
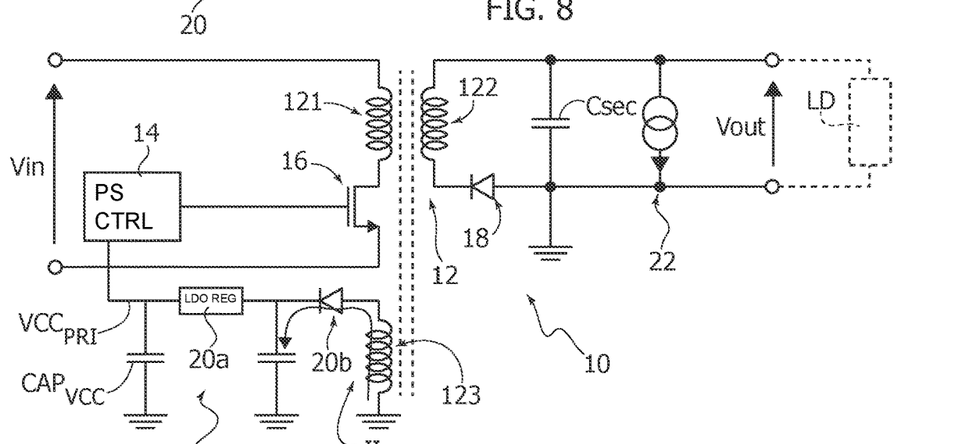
FIG. 8 is exemplary of energy transfer at a primary side of embodiments of the present description.

A first phase in this type of operation, as exemplified by I in FIG. 7 (and per se conventional in flyback converters), involves taking and storing energy from the primary side, while a second phase as exemplified in FIG. 8 involves transferring energy to Vout and VCCpri.

When the primary side switch 16 is turned off, the same voltage (under the 1:1 turn ratio assumption discussed previously) is generated at the auxiliary winding 123 and the secondary winding 122.

If VCCpri is lower than Vout, the diode 20b associated to the auxiliary winding 123 clamps the winding voltage to VCCpri so that the secondary side diode 18 is not turned on and the energy is transferred almost exclusively to VCCpri (as highlighted at II in FIG. 8).

Figure 9:
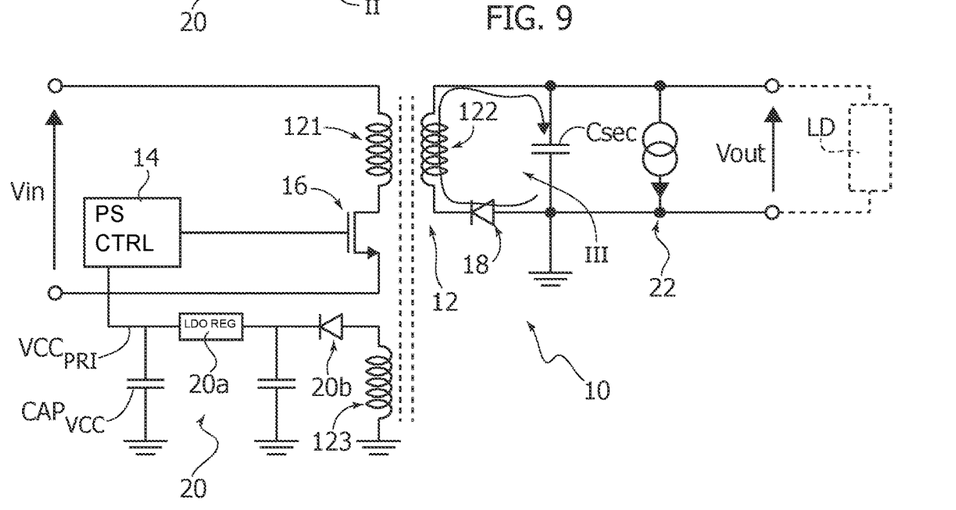
FIG. 9 is exemplary of energy transfer at an output in embodiments of the present description.

As exemplified at III in FIG. 9 energy is transferred to secondary side (only) as a result of VCCpri reaching the value of Vout.

In one or more embodiments:

during a normal burst, the energy delivered during the burst is high enough to charge both VCCpri and Vout, the proposed control is capable of providing a (small) amount of energy which is enough to charge only VCCpri, thus keeping the primary circuitry "alive" without undesirably increasing Vout.

Stated otherwise, one or more embodiments may force low energy bursts during Vout transitions when VCCpri is higher than UVLO but lower than a minimum value Vout.

While a bleeder such as 22 may still be advantageous for no load operation, advantages in terms of speed of transition can be achieved while avoiding monotonicity issues.

Figure 10:
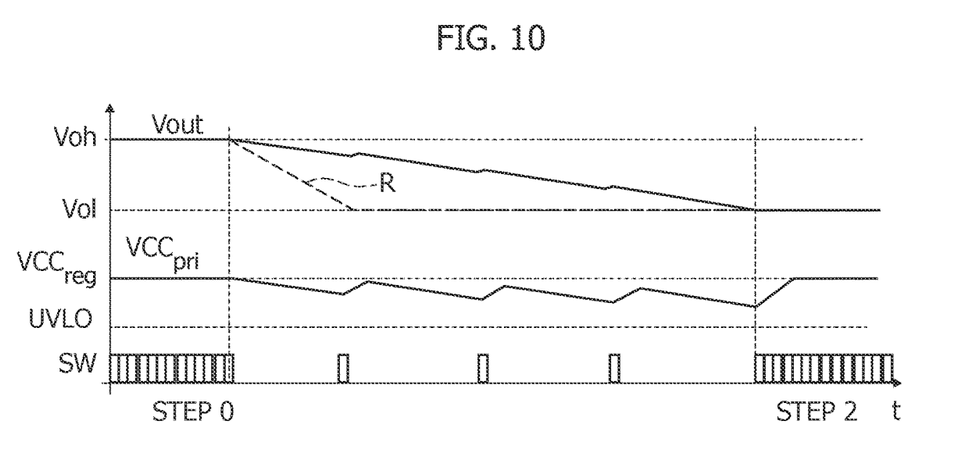
FIG. 10 is exemplary of a possible controlled burst behavior in embodiments of the present description.

As exemplified in FIG. 10 (which once more adopts the representation adopted in FIGS. 2, 3, 5 and 6) one or more embodiments facilitate charging VCCpri while the impact on Vout is limited, notionally nil.

In comparison with a slow ramp transition as exemplified in FIG. 6, operation according to one or more embodiments offer a number of advantages, such as:

the energy of each single burst packet can be the (very) low energy involve in charging (only) VCCpri;

burst operation is independent of a voltage ramp;

burst operation is independent of Vout;

limited impact on Vout;

effective impact on VCCpri.

One or more embodiments facilitate increasing converter speed insofar as changes in Vout change are limited only by bleeding capacity.

Operation as discussed previously, that is activating a forced burst, can be implemented in various ways.

In an exemplary case of time-based operation a burst can be forced as a result of a time-out reached during a negative transition while the system is not switching.

For instance, FIG. 10 may be regarded as exemplary of a case where a reference ramp signal R is provided which drops (e.g. linearly) faster than Vout.

As in the case of a conventional control (as implemented in the controller 14 in manner known to those of skill in the art) the converter 10 enters a burst mode and stops switching: in fact no further switching is requested by the voltage control loop until STEP 2 is reached.

As in the case of FIG. 6, in FIG. 10 low energy bursts at regular intervals are generated in order to keeping VCCpri alive. This kind of control has the advantage of being very simple requiring very low computation effort.

Again, the timeout bursts are set to a value short enough to avoid reaching UVLO. However, in the case of FIG. 10, the bursts are forced as a result of expiration of a timeout limit on the duration of the intervals during which switching on and off the current through the primary winding 121 of the transformer 12 is discontinued. In that way VCCpri is kept at an adequate value without any appreciable impact on Vout, which decreases in a substantial monotonous manner.

Other possible implementations of the same basic operating principles discussed previously are exemplified in FIGS. 11 and 12.

Here again entities, parts or elements like entities, parts or elements already discussed in connection with the previous figures are indicated with like reference symbols and a corresponding description will not be repeated for brevity.

An advantageous way of implementing a forced burst is to sense VCCpri, with a single or a double threshold, for instance. Such an approach facilitates a precise control on VCCpri and reduces the ripple on Vout.

Figure 11:
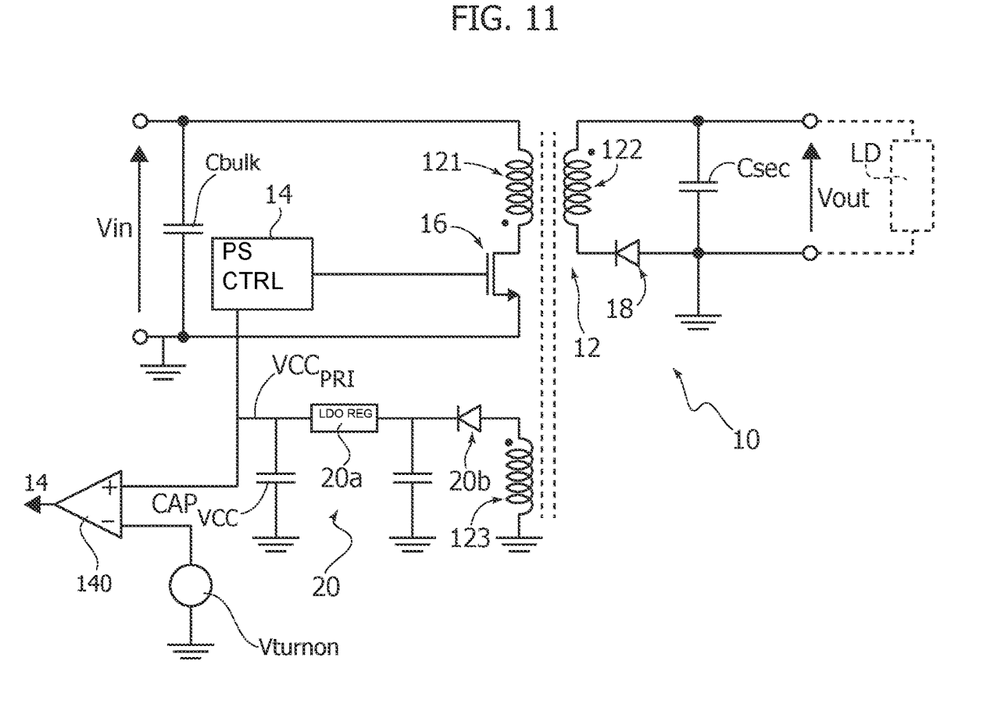
FIG. 11 is an exemplary block diagram of a power supply circuit according to embodiments of the present description using a single threshold.

FIG. 11 is exemplary of possible embodiments where a single threshold control (exemplified by a comparator 140, which is illustrated as a distinct component for ease of explanation, but may in fact be incorporated to the controller 14) enables forced burst operation when VCCpri<Vturnon, with the number and duration of the pulses of a forced burst suited to be defined (as programmable parameters, for instance) as a function of the characteristics of the converter 10 in order to avoid undesired impact on the secondary side.

Figure 12:
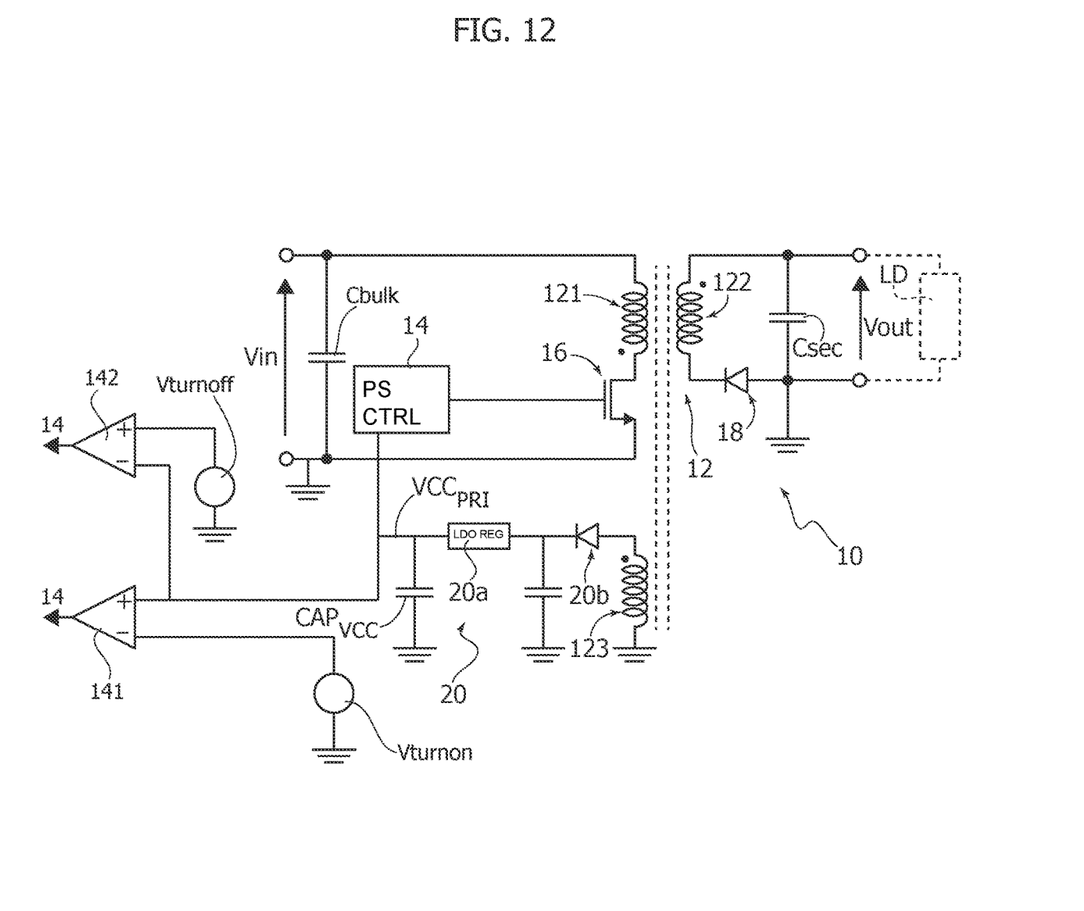
FIG. 12 is an exemplary block diagram of a power supply circuit according to embodiments of the present description using a double threshold.

FIG. 12 is exemplary of possible embodiments where two thresholds (exemplified by two comparators 141, 142 which are again illustrated as distinct components for ease of explanation, but may in fact be incorporated to the controller 14) enable forced burst operation when VCCpri<Vturnon (as a single threshold) and stop forced burst operation when VCCpri>Vturnoff.

Both FIGS. 11 and 12 also exemplary of the possibility for an input capacitance Cbulk being present between the input nodes of the input port of the converter 10 to which the input signal Vin is applied.

In that way the possibility exists of keeping VCCpri in a desired range with reduced impact on Vout.

Here again, the time between two forced bursts and the number of pulses may be set as programmable parameters.

Figure 13:
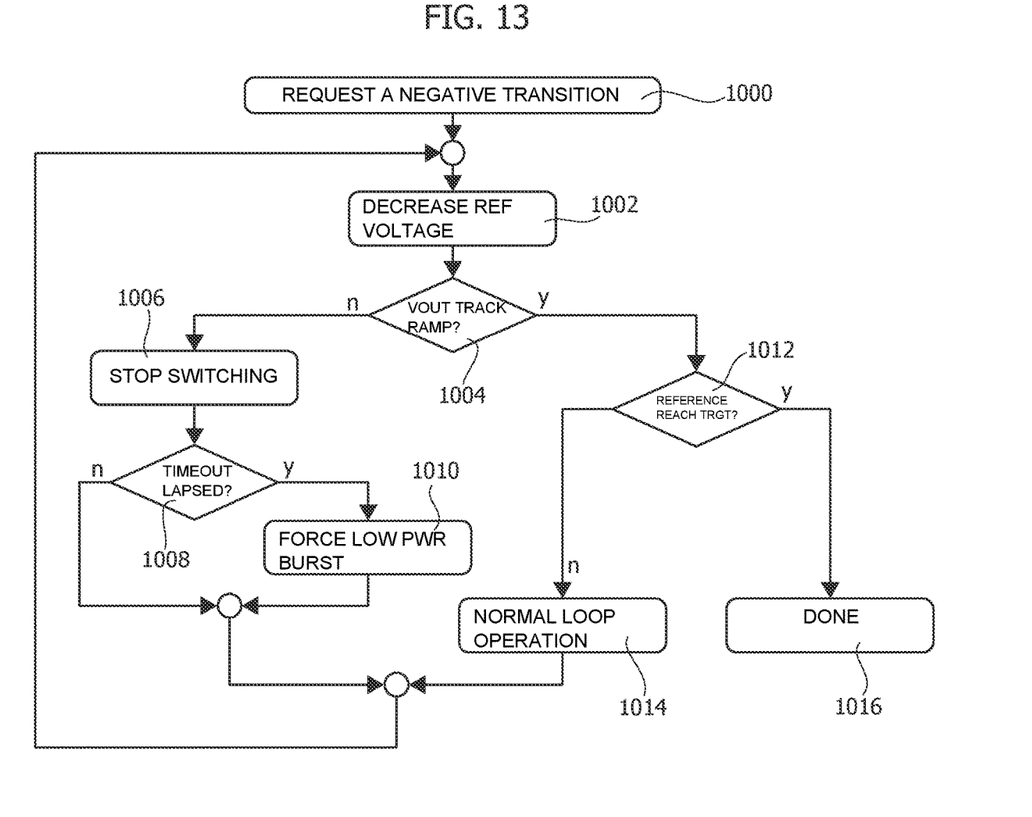
FIG. 13 is a flow chart exemplary of possible operation of embodiments of the present description.

The flow chart of FIG. 13 is exemplary of possible digital implementation of forced burst operation as discussed previously as a finite state machine (FSM) in the controller 14, for instance.

The blocks in the flow chart of FIG. 13 are exemplary of the following steps or acts:

block 1000: a negative transition (on Vout) is requested, as conventional in USB-PD protocols, for instance;

block 1002: reference voltage (ramp R, for instance) is decreased until target reached;

block 1004: is Vout tracking the ramp?

block 1006: stop switching as a result of negative outcome (n) of check at 1004;

block 1008: is timeout lapsed? Return upstream of 1002 if outcome negative (n);

block 1010: force low power burst as a result of positive outcome (y) of check at 1008 and return upstream of 1002;

block 1012: as a result of positive outcome (y) of check at 1004, has reference reached target?

block 1014: normal loop operation as a result of negative outcome (n) of check at 1012; return upstream of 1002;

block 1016: done, as a result of positive outcome (y) of check at 1012; this is indicative of the fact that the output voltage Vout has reached a desired (lower) target value as indicated in block 1000.

Figure 14:
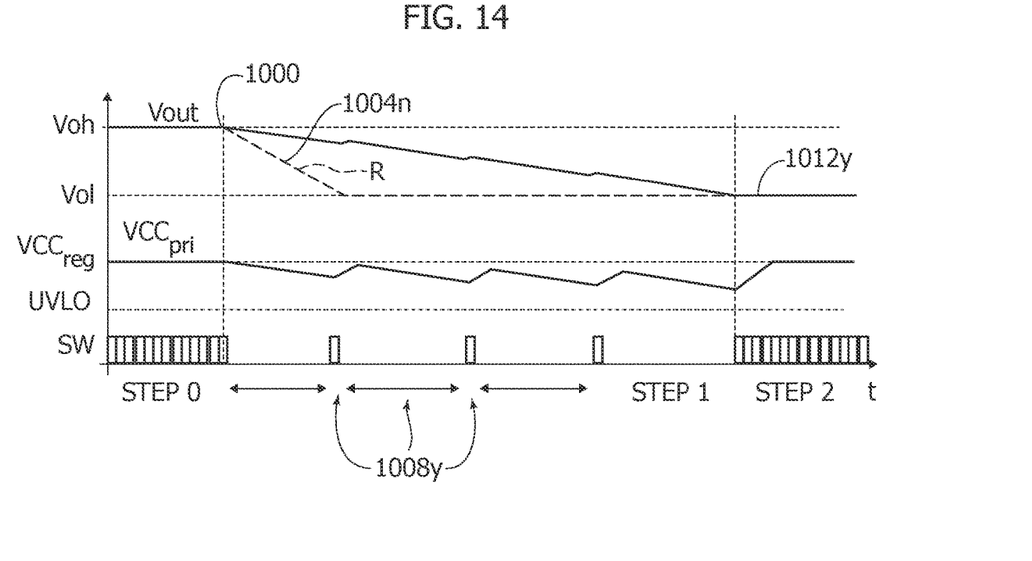
FIG. 14 is time diagram exemplary of possible signal waveforms in embodiments of the present description.

Possible time-related waveforms are shown in FIG. 14, which once more adopts the representation adopted in FIGS. 2, 3, 5, 6 and 10. In FIG. 14 points corresponding to certain blocks in the flow chart of FIG. 13 are indicated with suffixes "n" and "y" indicating possible negative and positive outcomes of the corresponding checks.

A (converter) circuit (for instance, 10) as exemplified herein may comprise a transformer (for instance, 12) having a primary winding (for instance, 121) coupled to an input port configured to receive an input voltage (for instance, Vin) and a secondary winding (for instance, 122) configured to deliver an output voltage (for instance, Vout) towards a load (for instance, LD), controller circuitry (for instance, 14) configured (for instance, via the switch 16) to switch on and off a current through the primary winding of the transformer wherein energy is transferred to the secondary winding of the transformer during switching on and off the current through the primary winding, supply circuitry (for instance, 20) for the controller circuitry, the supply circuitry coupled (for instance, via 20b) to an auxiliary winding (for instance, 123) in the transformer and configured to produce a supply voltage (for instance, VCCpri) for the controller circuitry, wherein the controller circuitry is configured to transition to a burst mode of operation to switch on and off the current through the primary winding of the transformer in bursts during which the current through the primary winding of the transformer is switched on and off, said bursts separated by intervals during which switching on and off the current through the primary winding of the transformer is discontinued and force said bursts targeting (that is, having as a target) maintaining the controller circuitry active with said supply voltage for the controller circuitry (14) between a lower bound (for instance, UVLO; Vturnon) and an upper bound (for instance, VCCreg; Vturnoff).

It will be appreciated that in a circuit as exemplified herein the controller circuitry can be maintained active irrespective of whether Vout is kept substantially constant (no transition) or reduced towards a valley value during a negative transition.

In a circuit as exemplified herein, the controller circuitry may be is configured to force said bursts as a result of expiration (see for instance, 1008y) of a timeout limit on the duration of said intervals during which switching on and off the current through the primary winding of the transformer is discontinued.

In a circuit as exemplified herein, the controller circuitry may be configured to force said bursts as a result of said supply voltage reaching (for instance, 1012) said lower bound value (for instance, Vturnon).

In a circuit as exemplified herein, the controller circuitry may be configured to discontinue forcing said bursts as a result of said supply voltage reaching said upper bound value (for instance, Vturnoff).

In a circuit as exemplified herein, the controller circuitry may be configured to stop operation of the circuit as a result of said supply voltage reaching an undervoltage lockout threshold, wherein said lower bound is higher than said undervoltage lockout threshold.

In a circuit as exemplified herein, said auxiliary winding (for instance, 123) in the transformer may arranged at the primary winding side of the transformer.

A device as exemplified herein (for instance, any of the devices listed in the introductory portion of this description) may comprise a circuit as exemplified herein and an electrical load (for instance, LD) coupled (for instance, via a capacitor Csec) to the secondary winding of the transformer.

A method of operation of a circuit as exemplified herein may comprise receiving (for instance, 1000) at said controller circuitry (14) a request to reduce (for instance, 1002) the output voltage at the secondary winding of the transformer towards a valley value, said controller circuitry transitioning (for instance, 1004n) to said burst mode of operation, with the controller circuitry forcing said bursts (for instance, 1008, 1010) targeting (that is, having as a target) maintaining the controller circuitry (14) active.

A method as exemplified herein may comprise checking (for instance, 1012) if the output voltage at the secondary winding of the transformer has reached said valley value, said controller circuitry exiting (for instance, 1016) said burst mode of operation as a result of said checking (for instance, 1012) indicating that the output voltage at the secondary winding of the transformer has reached said valley value.

Without prejudice to the underlying principles, the details and embodiments may vary, even significantly, with respect to what has been described by way of example only, without departing from the extent of protection.

The extent of protection is determined by the annexed claims.

What is claimed is:

1. A circuit comprising:
a transformer having a primary winding coupled to an input port configured to receive an input voltage and a secondary winding configured to provide an output voltage at an output port;
controller circuitry configured to switch on and off a current through the primary winding so that energy is transferred to the secondary winding while switching on and off; and
supply circuitry connected to the controller circuitry,
wherein the supply circuitry is coupled to an auxiliary winding of the transformer and configured to produce a supply voltage for the controller circuitry,
wherein the controller circuitry is further configured to:
transition to a burst mode to switch on and off the current through the primary winding in first bursts during which the current through the primary winding is switched on and off, wherein the first bursts are separated by intervals during which switching on and off the current through the primary winding of the transformer by the first bursts is discontinued; and
provide second bursts during the intervals to keep the supply voltage of the controller circuitry between a lower bound value and an upper bound value while the output voltage ramps down to a requested valley value; or
provide the second bursts during the intervals after reaching a timeout limit to provide the supply voltage to the controller circuitry while the output voltage ramps down to the requested valley value; and
wherein the controller circuitry is further configured to:
receive a request for an electrical load to reduce the output voltage at the output port toward the requested valley value;
transition to the burst mode in response to ramping down the output voltage to the requested valley value;
determine whether the output voltage at the output port has reached the requested valley value; and
exit the burst mode in response to the output voltage reaching the requested valley value.

2. The circuit of claim 1, wherein the controller circuitry is configured to provide the second bursts in response to the supply voltage reaching the lower bound value.

3. The circuit of claim 2, wherein the controller circuitry is configured to discontinue providing the second bursts in response to the supply voltage reaching the upper bound value.

4. The circuit of claim 2, wherein the lower bound value is higher than an under voltage lock out threshold.

5. The circuit of claim 1, wherein the timeout limit is short enough to avoid reaching an under voltage lock out threshold.

6. The circuit of claim 1, wherein the auxiliary winding is arranged at a side of the transformer corresponding to the primary winding.

7. A device comprising:
the circuit of claim 1; and
an electrical load coupled to the output port.

8. The circuit of claim 1, wherein the controller circuitry comprises a comparator circuit configured to compare the supply voltage to a threshold voltage.

9. The circuit of claim 1, wherein the supply circuitry further comprises a diode coupled between a low-dropout (LDO) regulator and the auxiliary winding.

10. A method for operating a circuit, wherein the circuit comprises a transformer having a primary winding coupled to an input port for receiving an input voltage and a secondary winding for providing an output voltage at an output port, controller circuitry for switching on and off a current through the primary winding so that energy is transferred to the secondary winding while switching on and off, and supply circuitry connected to the controller circuitry, and wherein the supply circuitry is coupled to an auxiliary winding in the transformer, the method comprising:
receiving, at the controller circuitry, a request to reduce the output voltage at the output port towards a requested valley value;
transitioning, by the controller circuitry, to a burst mode to switch on and off the current through the primary winding in first bursts during which the current through the primary winding is switched on and off, wherein the first bursts are separated by intervals during which switching on and off the current through the primary winding of the transformer by the first bursts is discontinued;
providing, by the controller circuitry, second bursts during the intervals to keep a supply voltage of the controller circuitry between a lower bound value and an upper bound value while the output voltage ramps down to the requested valley value;
providing, by the controller circuitry, the second bursts during the intervals after reaching a timeout limit to provide the supply voltage to the controller circuitry while the output voltage ramps down to the requested valley value, and wherein the timeout limit is short enough to avoid reaching an under voltage lock out threshold;
determining, by the controller circuitry, whether the output voltage at the output port has reached the requested valley value; and
exiting, by the controller circuitry, the burst mode in response to the output voltage reaching the requested valley value.

11. The method of claim 10, wherein the lower bound value is higher than the under voltage lock out threshold.

12. The method of claim 10, further comprising discontinuing providing the second bursts in response to the supply voltage reaching the upper bound value.

13. The method of claim 10, wherein the auxiliary winding is arranged at a side of the transformer corresponding to the primary winding.

14. The method of claim 10, further comprising providing the second bursts in response to the supply voltage reaching the lower bound value.

15. The method of claim 10, wherein the controller circuitry comprises a comparator circuit to compare the supply voltage to a threshold voltage, and wherein the supply circuitry comprises a diode coupled between a low-dropout (LDO) regulator and the auxiliary winding.

16. A method for operating a circuit, wherein the circuit comprises a transformer having a primary winding coupled to an input port for receiving an input voltage and a secondary winding for providing an output voltage at an output port, controller circuitry for switching on and off a current through the primary winding so that energy is transferred to the secondary winding while switching on and off, and supply circuitry connected to the controller circuitry, and wherein the supply circuitry is coupled to an auxiliary winding in the transformer, the method comprising:

- receiving, at the controller circuitry, a request to reduce the output voltage at the output port towards a requested valley value;
- transitioning, by the controller circuitry, to a burst mode to switch on and off the current through the primary winding in first bursts during which the current through the primary winding is switched on and off so that the first bursts are separated by intervals during which switching on and off the current through the primary winding of the transformer by the first bursts is discontinued;
- decreasing, by the controller circuitry, a slope of a supply voltage for the controller circuitry slower than a slope of the output voltage during the intervals;
- receiving, at the controller circuitry, a request for an electrical load to reduce the output voltage at the output port towards the requested valley value;
- transitioning, by the controller circuitry, to the burst mode, in response to the receiving the request for the electrical load to reduce the output voltage;
- determining, by the controller circuitry, whether the output voltage at the output port has reached the requested valley value; and
- exiting, by the controller circuitry, the burst mode in response to the output voltage reaching the requested valley value.

17. The method of claim 16, wherein the auxiliary winding is arranged at a side of the transformer corresponding to the primary winding.

18. The method of claim 16, further comprising:
providing, by the controller circuitry, second bursts during the intervals to keep the supply voltage of the controller circuitry between a lower bound value and an upper bound value while the output voltage ramps down to the requested valley value; or
providing, by the controller circuitry, the second bursts during the intervals after reaching a timeout limit to provide the supply voltage to the controller circuitry while the output voltage ramps down to the requested valley value, and wherein the timeout limit is short enough to avoid reaching an under voltage lock out threshold.

19. The method of claim 18, wherein the lower bound value is higher than the under voltage lock out threshold.

20. The method of claim 16, wherein the controller circuitry comprises a comparator circuit to compare the supply voltage to a threshold voltage, and wherein the supply circuitry comprises a diode coupled between a low-dropout (LDO) regulator and the auxiliary winding.

* * * * *